(12) United States Patent
Kawashima et al.

(10) Patent No.: US 9,632,380 B2
(45) Date of Patent: Apr. 25, 2017

(54) LIQUID CRYSTAL DISPLAY DEVICE

(71) Applicant: Sharp Kabushiki Kaisha, Osaka-shi, Osaka (JP)

(72) Inventors: Yuki Kawashima, Osaka (JP); Yasuyoshi Kaise, Osaka (JP)

(73) Assignee: SHARP KUBUSHIKI KAISHA, Sakai (JP)

( * ) Notice: Subject to any disclaimer, the term of this patent is extended or adjusted under 35 U.S.C. 154(b) by 101 days.

(21) Appl. No.: 14/428,694

(22) PCT Filed: Sep. 26, 2013

(86) PCT No.: PCT/JP2013/076088
§ 371 (c)(1),
(2) Date: Mar. 17, 2015

(87) PCT Pub. No.: WO2014/054500
PCT Pub. Date: Apr. 10, 2014

(65) Prior Publication Data
US 2015/0219973 A1    Aug. 6, 2015

(30) Foreign Application Priority Data
Oct. 3, 2012   (JP) ................................. 2012-221529

(51) Int. Cl.
*G02F 1/1343*  (2006.01)
*G02F 1/1362*  (2006.01)
(Continued)

(52) U.S. Cl.
CPC ...... *G02F 1/136286* (2013.01); *G02F 1/1362* (2013.01); *G02F 1/1368* (2013.01);
(Continued)

(58) Field of Classification Search
CPC ................................................. G02F 1/134363
(Continued)

(56) References Cited

U.S. PATENT DOCUMENTS 6,459,464 B1 * 10/2002 Nakasima ......... G02F 1/134363
349/141
2008/0068549 A1    3/2008 Liao et al.
(Continued)

FOREIGN PATENT DOCUMENTS

JP    2010-101946 A    5/2010
JP    2010-271487 A    12/2010
(Continued)

OTHER PUBLICATIONS

Official Communication issued in International Patent Application No. PCT/JP2013/076088, mailed on Dec. 10, 2013.

*Primary Examiner* — Thanh-Nhan P Nguyen
(74) *Attorney, Agent, or Firm* — Keating & Bennett, LLP

(57) ABSTRACT

A liquid crystal display device includes a TFT array substrate (first substrate), a counter substrate (second substrate), a liquid crystal layer, and a common electrode (first electrode), an insulating film, and pixel electrodes 21 (second electrode) that are provided on the TFT array substrate. Each of the pixel electrodes 21 has a plurality of linear electrodes 26 and a first connection portion 27. Each of the linear electrodes 26 has a main line portion 29 and a first bent portion 30. An additional capacitance portion 32 is provided integrally with the first connection portion 27 in a region along an arrangement direction of a plurality of first bent portions 30.

20 Claims, 8 Drawing Sheets

(51) Int. Cl.
  *G02F 1/1333* (2006.01)
  *G02F 1/1335* (2006.01)
  *G02F 1/1368* (2006.01)
  *G02F 1/136* (2006.01)

(52) U.S. Cl.
  CPC .. *G02F 1/133345* (2013.01); *G02F 1/133512* (2013.01); *G02F 1/134309* (2013.01); *G02F 1/134363* (2013.01); *G02F 2001/13606* (2013.01); *G02F 2001/134372* (2013.01)

(58) Field of Classification Search
  USPC .................................................... 349/141
  See application file for complete search history.

(56) References Cited

U.S. PATENT DOCUMENTS

| | | |
|---|---|---|
| 2010/0207853 A1 | 8/2010 | Chen et al. |
| 2010/0296019 A1 | 11/2010 | Taniguchi et al. |
| 2011/0109862 A1* | 5/2011 | Harada ............. G02F 1/134363 349/141 |
| 2012/0127148 A1 | 5/2012 | Lee et al. |
| 2012/0169985 A1* | 7/2012 | Kim ................. G02F 1/136227 349/139 |

FOREIGN PATENT DOCUMENTS

| | | |
|---|---|---|
| JP | 2012-113305 A | 6/2012 |
| JP | 2012-141579 A | 7/2012 |

* cited by examiner

LIQUID CRYSTAL DISPLAY DEVICE

TECHNICAL FIELD

The present invention relates to a liquid crystal display device.

This application claims priority based on Japanese Patent Application No. 2012-221529, filed on Oct. 3, 2012, the contents of which are incorporated herein by reference.

BACKGROUND ART

In a liquid crystal display device, a transverse field system is hitherto known as a system which applies an electric field to a liquid crystal layer. In a transverse field liquid crystal display device, a common electrode and pixel electrodes are provided on one substrate of a pair of substrates with a liquid crystal layer sandwiched therebetween, and an electric field in a substantially transverse direction (a direction substantially parallel to the substrates) relative to the liquid crystal layer is applied to the liquid crystal layer. In this case, since directors of liquid crystal molecules are not erected in a direction perpendicular to the substrates, there is an advantage that a viewing angle is widened. The transverse field liquid crystal display device includes an IPS (In-Plane Switching) liquid crystal display device and an FFS (Fringe Field Switching) liquid crystal display device which are different from each other in the electrode configuration.

The FFS liquid crystal display device generally includes a lower layer electrode which is formed on a substantially entire region in a pixel, and an upper layer electrode which is disposed above the lower layer electrode with an insulating film sandwiched therebetween and has a plurality of linear electrodes (for example, PTL 1). The FFS liquid crystal display device includes a type in which the lower layer electrode is used as a common electrode and the upper layer electrode is used as a pixel electrode, and a type in which the lower layer electrode is used as a pixel electrode and the upper layer electrode is used as a common electrode. In all cases, the pixel electrode and the common electrode overlap each other in plan view with the insulating film sandwiched therebetween, and pixel capacitance is formed in the overlapping portion.

In recent years, a liquid crystal display device has higher definition, and the pixel size tends to be smaller.

As described above, in the FFS liquid crystal display device, since the pixel capacitance is formed in the overlapping portion of the pixel electrode and the common electrode, the pixel capacitance decreases with the reduction in size of the pixel. If the pixel capacitance decreases, flickering or crosstalk is likely to occur, causing deterioration of display quality.

CITATION LIST

Patent Literature

PTL 1: Japanese Laid-open Patent Publication No. 2010-101946

SUMMARY OF INVENTION

Technical Problem

As means for suppressing flickering, crosstalk, or the like, there are a method of adding a light-shielding film to a rear surface of a thin film transistor (hereinafter, referred to as TFT) constituting a liquid crystal display device, a method of increasing pixel capacitance, and the like. Of these, the method of adding the light-shielding film to the rear surface of the TFT has a problem in that a workload increases or a load on a bus line increases. As one of the methods of increasing the pixel capacitance, it is considered to reduce the thickness of the insulating film between the pixel electrode and the common electrode. However, if the thickness of the insulating film is reduced, for example, there is a problem in that a leakage current increases. For this reason, there is a limitation to reduce the thickness of the insulating film. From the above, when increasing the pixel capacitance, it is effective to increase the area of the overlapping portion of the pixel electrode and the common electrode.

The liquid crystal display device of PTL 1 includes a lens member for condensing light from a backlight. In this liquid crystal display device, the area of an electrode in a non-light condensing region of the lens member, that is, a region not substantially contributing to display is increased to increase the pixel capacitance. On the other hand, an increase in the electrode area in the region not substantially contributing to display leads to deterioration of an aperture ratio. For this reason, in a general liquid crystal display device with no lens member, bright display is not obtained. If the width of the linear electrode is enlarged as a whole, a display characteristic, such as transmittance, may be affected. If the width of the linear electrode is enlarged and the distance between the pixel electrodes of adjacent pixels becomes short over an allowable range, color mixing may occur between adjacent pixels.

The invention has been accomplished in order to solve the above-described problems, and an object of the invention is to provide a liquid crystal display device capable of increasing pixel capacitance to suppress flickering or the like while suppressing the occurrence of problems of degradation of light transmittance, color mixing, and the like, and capable of increasing display quality.

Solution to Problem

In order to attain the above-described object, a liquid crystal display device according to an aspect of the invention includes a first substrate, a second substrate, a liquid crystal layer which is sandwiched between the first substrate and the second substrate, a first electrode which is provided on a side of the first substrate, where the liquid crystal layer is disposed, an insulating film which covers the first electrode, and a second electrode which is provided on the insulating film. The second electrode has a plurality of linear electrodes which are disposed at predetermined intervals, and a first connection portion which connects the first end portions of the plurality of linear electrodes, each of the plurality of linear electrodes has a main line portion, and a first bent portion which is provided between the main line portion and the first connection portion and is bent in a direction different from the extension direction of the main line portion, and in the second electrode, an additional capacitance portion is provided integrally with the first connection portion in a region along the arrangement direction of a plurality of first bent portions.

In the liquid crystal display device according to the aspect of the invention, the second electrode has the plurality of linear electrodes, the first connection portion, and a second connection portion which connects second end portions opposite to the first end portions of the plurality of linear electrodes, each of the plurality of linear electrodes has the main line portion, the first bent portion, and a second bent portion which is provided between the main line portion and the second connection portion and is bent in a direction different from the extension direction of the main line portion, and the additional capacitance portion is provided in a region along the arrangement direction of a plurality of second bent portions in addition to the region along the arrangement direction of the plurality of first bent portions.

In the liquid crystal display device according to the aspect of the invention, the opposing sides of the additional capacitance portion and the linear electrode adjacent to the additional capacitance portion are substantially parallel to each other, and the interval between the additional capacitance portion and the linear electrode is substantially equal to the interval between two adjacent linear electrodes.

In the liquid crystal display device according to the aspect of the invention, the length of the additional capacitance portion is equal to the length of the first bent portion or the length of the second bent portion.

In the liquid crystal display device according to the aspect of the invention, the additional capacitance portion is disposed in a light-shielding region.

In the liquid crystal display device according to the aspect of the invention, in a first pixel and a second pixel adjacent to each other, the extension direction of the linear electrode of the first pixel and the extension direction of the linear electrode of the second pixel are inclined in opposite directions relative to the longitudinal direction of the first pixel and the second pixel.

Advantageous Effects of Invention

According to the aspect of the invention, it is possible to realize a liquid crystal display device which increases pixel capacitance to suppress flickering or the like while suppressing the occurrence of problems of degradation of light transmittance, color mixing, and the like, and achieves high display quality.

DESCRIPTION OF EMBODIMENTS

[First Embodiment]

Hereinafter, a first embodiment of the invention will be described referring to FIGS. 1 to 5.

A liquid crystal display device of this embodiment is a transverse field liquid crystal display device, particularly, an FFS liquid crystal display device which includes a first electrode and a second electrode on one substrate of a pair of substrates with a liquid crystal layer sandwiched therebetween, and drives liquid crystal by an electric field applied between the first electrode and the second electrode.

Figure 1:
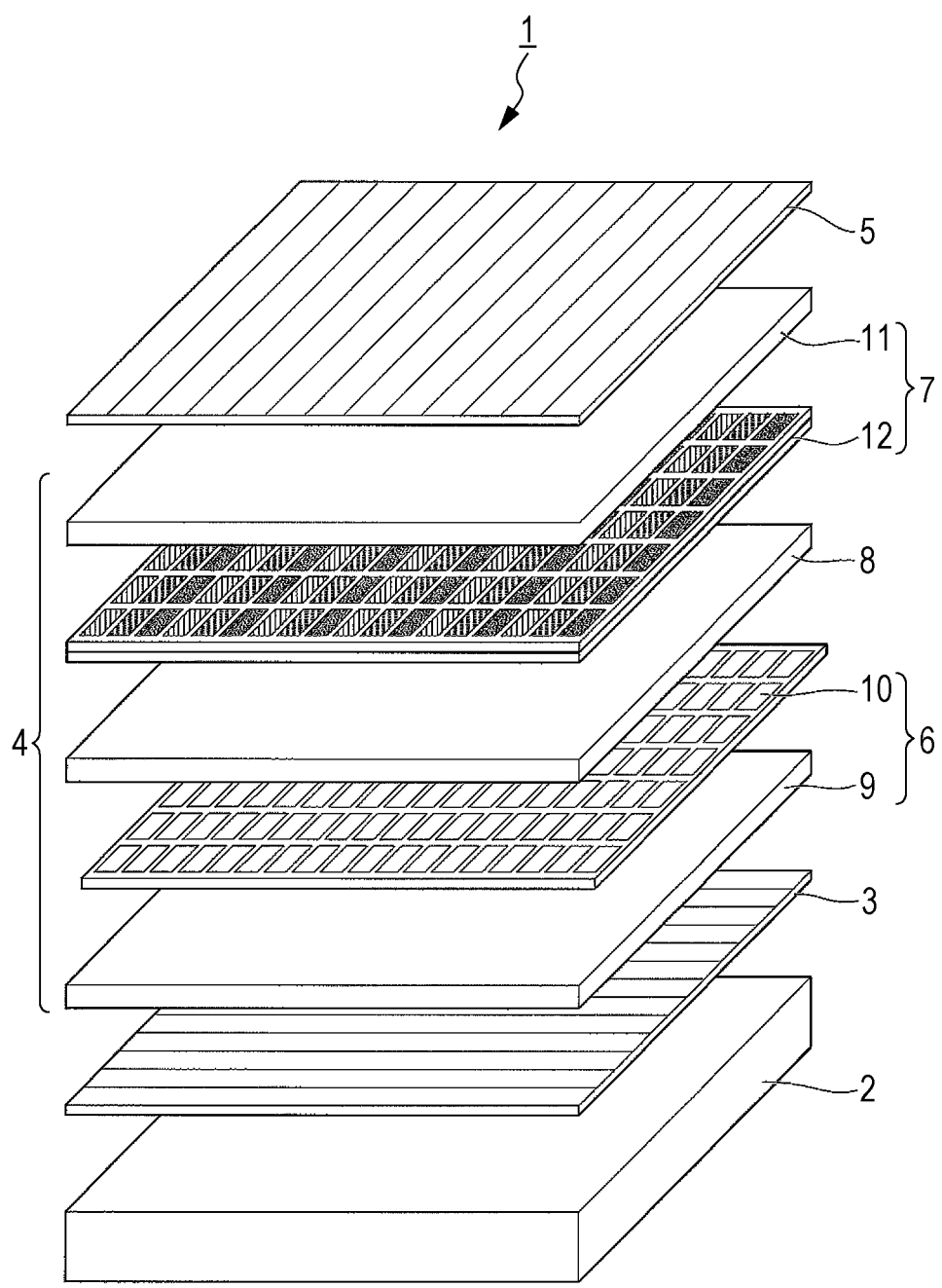
FIG. 1 is an exploded perspective view showing the schematic configuration of a liquid crystal display device of a first embodiment.
Figure 2:
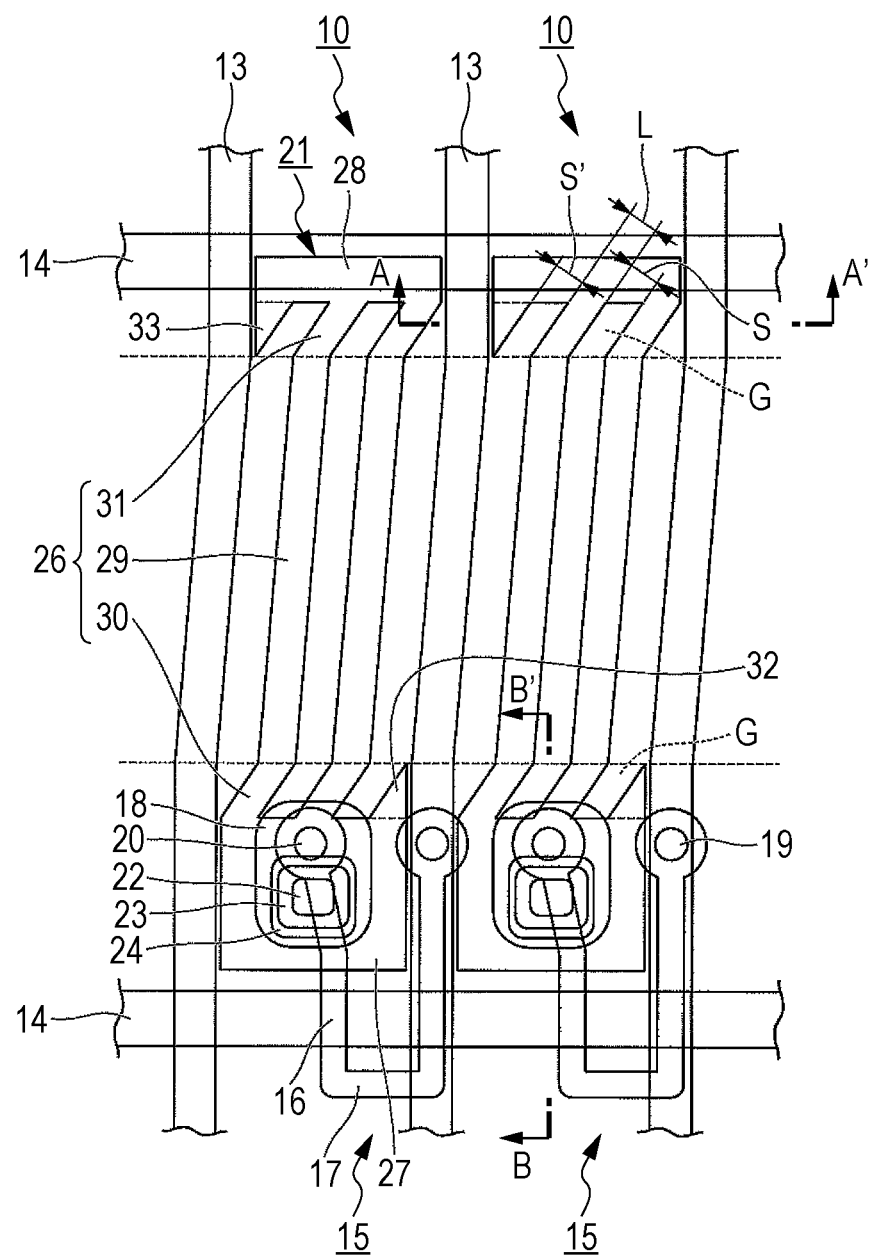
FIG. 2 is a plan view showing two pixels of the liquid crystal display device of this embodiment.
Figure 3:
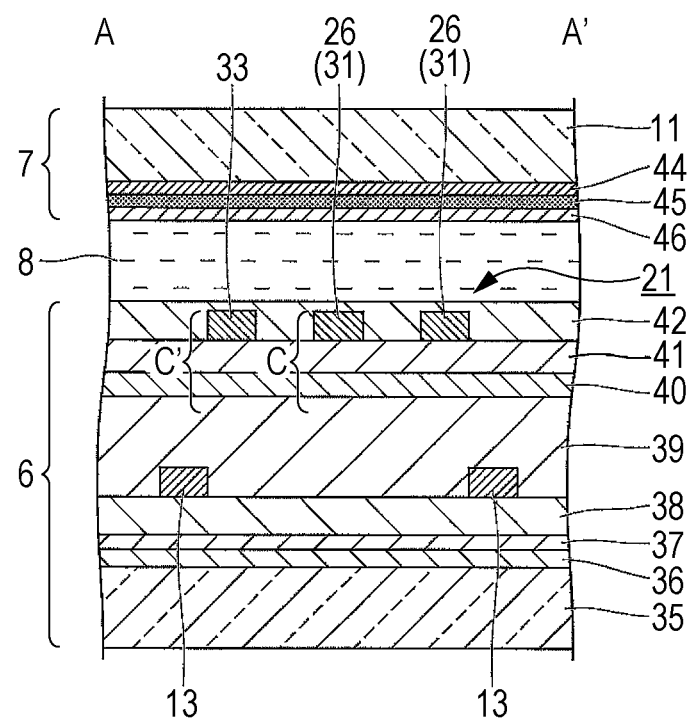
FIG. 3 is a cross-sectional view taken along the line A-A' of FIG. 2.
Figure 4:
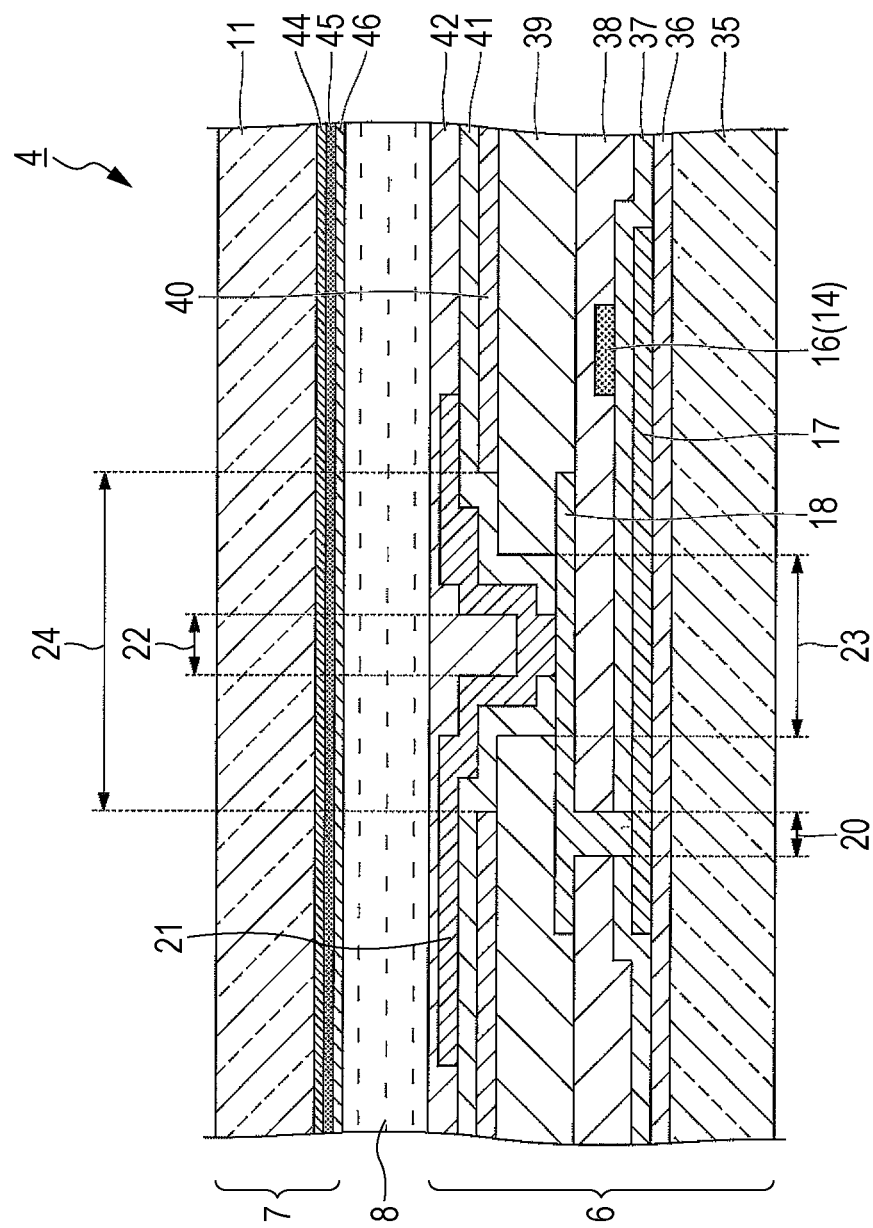
FIG. 4 is a cross-sectional view taken along the line B-B' of FIG. 2.

FIG. 1 is an exploded perspective view showing the schematic configuration of the liquid crystal display device of this embodiment. FIG. 2 is a plan view showing two adjacent pixels of the liquid crystal display device of this embodiment. FIG. 3 is a cross-sectional view taken along the line A-A' of FIG. 2. FIG. 4 is a cross-sectional view taken along the line B-B' of FIG. 2.

In the respective drawings, the scale of the size of each constituent has been adjusted to be recognizable.

As shown in FIG. 1, a liquid crystal display device 1 of this embodiment includes, from the deep side when viewed from an observer, a backlight 2, a polarizing plate 3, a liquid crystal cell 4, and a polarizing plate 5. In this way, the liquid crystal display device 1 of this embodiment is a transmissive liquid crystal display device. The liquid crystal display device 1 performs display while controlling transmittance of light emitted from the backlight 2 by the liquid crystal cell 4.

The liquid crystal cell 4 has a TFT array substrate 6 and a counter substrate 7 opposed to each other. A liquid crystal layer 8 is sandwiched between the TFT array substrate 6 and the counter substrate 7. For the liquid crystal layer 8, a positive type liquid crystal material is generally used, but a negative type liquid crystal material may be used. The TFT array substrate 6 has a plurality of pixels 10 arranged in a matrix on a substrate 9, and a display region (screen) is constituted by these pixels 10. In the counter substrate 7, a color filter 12 is provided on a substrate body 11.

The TFT array substrate 6 of this embodiment corresponds to a first substrate recited in the appended claims. The counter substrate 7 of this embodiment corresponds to a second substrate recited in the appended claims.

Though not shown in FIG. 1, the display region has a plurality of source bus lines (signal lines) arranged in parallel with one another and a plurality of gate bus lines (scan lines) arranged in parallel with one another. A plurality of source bus lines and a plurality of gate bus lines are arranged so as to intersect one another. The display region is divided into a lattice shape by a plurality of source bus lines and a plurality of gate bus lines, and the substantially rectangular divided regions become the pixels 10.

As shown in FIG. 2, each pixel 10 is provided with a TFT 15 near the intersection of the source bus line 13 and the gate bus line 14. The TFT 15 of this embodiment includes a gate electrode 16 formed of a part of the gate bus line 14, a semiconductor layer 17 disposed so as to intersect the gate bus line, and a drain electrode 18. The semiconductor layer 17 is made of, for example, amorphous silicon, polycrystalline silicon, oxide semiconductor, or the like. As the material for forming the semiconductor layer 17, in addition to amorphous silicon and polycrystalline silicon, as oxide semiconductor, for example, oxide semiconductor (In-GaZnO) which is called IGZO and is made of indium (In), gallium (Ga), and zinc (Zn) can be used. In addition to IGZO, for example, In—Zn—O-based oxide semiconductor which is called IZO and is made of indium (In) and zinc (Zn), Zn—Ti—O-based oxide semiconductor which is called ZTO and is made of zinc (Zn) and titanium (Ti), or the like can be used. One end portion of the semiconductor layer 17 is electrically connected to the source bus line 13 through a source contact hole 19. The other end portion of the semiconductor layer 17 is electrically connected to the drain electrode 18 through a drain contact hole 20. The pixel electrode 21 is electrically connected to the drain electrode 18 through a pixel contact hole 22. In FIG. 2, reference numeral 23 denotes a through hole, and reference numeral 24 denotes a punched pattern of the common electrode. These will be described below.

As shown in FIG. 2, the pixel electrode 21 has a plurality (in this embodiment, two) of linear electrodes 26, a first connection portion 27, and a second connection portion 28. A plurality of linear electrodes 26 are disposed at predetermined intervals. In this embodiment, the width L of the linear electrode 26 and the interval S between adjacent linear electrodes 26 are about 2 to 5 µm. The first connection portion 27 is a substantially rectangular portion which connects the first end portions of a plurality of linear electrodes 26 close to the TFT 15. The second connection portion 28 is a substantially rectangular portion which connects the second end portions of a plurality of linear electrodes 26 distant from the TFT 15. In this embodiment, the pixel electrode 21 has two linear electrodes 26, but the number of linear electrodes 26 is not limited to two and can be appropriately set.

The linear electrode 26 has a main line portion 29, a first bent portion 30, and a second bent portion 31. The main line portion 29, the first bent portion 30, and the second bent portion 31 are described separately for convenience, but these portions form an integrated electrode. In this embodiment, the extension direction of the main line portion 29 is inclined relative to the longitudinal direction of the pixel. Specifically, the first end portion (the lower end portion of FIG. 2) of the main line portion 29 is shifted to the left side relative to the longitudinal direction of the pixel 10, and the second end portion (the upper end portion of FIG. 2) of the main line portion 29 is shifted to the right side relative to the longitudinal direction of the pixel 10.

The longitudinal direction of the pixel 10 is defined as a direction perpendicular to the extension direction of the gate bus line 14.

In contrast, though not shown, the main line portion of a pixel (upper or lower pixel) adjacent to the pixel 10 shown in FIG. 2 in the extension direction of the source bus line 13 is inclined in a direction opposite to the main line portion of the pixel. That is, in the main line portion of a pixel (upper or lower pixel) adjacent to the pixel 10 of FIG. 2, the first end portion (the lower end portion of FIG. 2) of the main line portion is shifted to the right side relative to the longitudinal direction of the pixels, and the second end portion (the upper end portion of FIG. 2) of the main line portion is shifted to the left side relative to the longitudinal direction of the pixel.

In the source bus line 13, a portion near the TFT 15 is disposed so as to be substantially orthogonal to the gate bus line 14. A portion along the linear electrode 26 is disposed substantially in parallel to the linear electrode 26 adjacent to the source bus line 13. Accordingly, when the source bus line 13 is viewed in the extension direction, the source bus line 13 is bent in zigzag.

In this embodiment, as described above, the linear electrodes 26 are inclined in opposite directions between two adjacent pixels 10 along the source bus line 13. With this electrode configuration, in the two pixels 10, the directions of the directors of the liquid crystal molecules are symmetrical horizontally between adjacent upper and lower pixels. A structure in which two domains with different alignment directions of liquid crystal molecules in one pixel are formed, a so-called dual domain structure is already known. In this embodiment, a dual domain structure is used with two adjacent pixels 10 along the source bus line 13 as a single unit, instead of one pixel. With this, the wide viewing angle of the liquid crystal display device 1 can be achieved.

The first bent portion 30 is a portion between the main line portion 29 and the first connection portion 27, and is bent in a direction inclined from the extension direction of the main line portion 29. Similarly, the second bent portion 31 is a portion between the main line portion 29 and the second connection portion 28, and is bent in a direction inclined from the extension direction of the main line portion 29. The first bent portion 30 and the second bent portion 31 are substantially disposed in a light-shielding region G covered with a black matrix. The edge of light-shielding region G (black matrix) is indicated by a broken line. Though not shown since the drawing is difficult to be viewed, a black matrix is provided in a region overlapping the source bus line 13, and this region becomes a light-shielding region.

In this way, the first bent portion 30 and the second bent portion 31 are provided, whereby the connected portion of the linear electrode 26 and the first connection portion 27 and the connected portion of the linear electrode 26 and the second connection portion 28 have an acute triangular shape. This shape functions to suppress the occurrence of abnormal alignment of liquid crystal when a pressing force is applied to the liquid crystal display device 1 from the outside.

That is, in the connected portion of the linear electrode and the connection portion, regions where the twist directions of liquid crystal molecules are opposite to each other may be alternately generated. At this time, in the middle of a region where the liquid crystal molecules are in opposite twist directions, a region where the liquid crystal molecules are not twisted in any direction is generated. This portion becomes a dark line and causes degradation of transmittance. When the pressing force is applied to the liquid crystal display device from the outside, the dark line moves beyond the light-shielding region according to the pressing force. For this reason, the movement of the dark line is visually recognized as display unevenness by the user. In contrast, as in this embodiment, if the connected portions of the linear electrode 26 and the first connection portion 27 and the second connection portion 28 have an acute triangular shape, the twist state of the liquid crystal molecules is fixed, and a dark line is generated. However, even when a pressing force is applied to the liquid crystal display device 1 from the outside, the dark line does not move. With this, display unevenness is not easily visually recognized by the user.

An additional capacitance portion 32 is provided integrally with the first connection portion 27 in a region along the arrangement direction of a plurality of first bent portions 30. In this embodiment, the planar shape of the additional capacitance portion 32 is a substantially right angled triangular shape. When focusing on the additional capacitance portion 32 and the linear electrode 26 adjacent to the additional capacitance portion 32, the opposing sides of the additional capacitance portion 32 and the linear electrode 26, that is, the hypotenuse of the triangle as the outline of the additional capacitance portion 32 and the hypotenuse of the first bent portion 30 are substantially in parallel to each other. The interval S' between the additional capacitance portion 32 and the linear electrode 26 is substantially equal to the interval between two adjacent linear electrodes 26. The leading end (the apex of the triangle) of the additional capacitance portion 32 is substantially aligned with the position of the upper end of the first bent portion 30. Accordingly, similarly to the first bent portion 30, the additional capacitance portion 32 is disposed in the light-shielding region G.

An additional capacitance portion 33 is provided integrally with the second connection portion 28 in a region along the arrangement direction of a plurality of second bent portions 31. The feature of the additional capacitance portion 33 on the second connection portion 28 side is the same as the feature of the additional capacitance portion 32 on the first connection portion 27 side. That is, the planar shape of the additional capacitance portion 33 is a substantially right angled triangular shape. In the additional capacitance portion 33 and the linear electrode 26 adjacent to the additional capacitance portion 33, the opposing sides of the additional capacitance portion 33 and the linear electrode 26 are substantially in parallel to each other. The interval S' between the additional capacitance portion 33 and the linear electrode 26 is substantially equal to the interval S between two adjacent linear electrodes 26. The leading end (the apex of the triangle) of the additional capacitance portion 33 is substantially aligned with the position of the lower end of the second bent portion 31, and the additional capacitance portion 33 is disposed in the light-shielding region G.

The common electrode is formed on the entire surface of the substrate excluding the inside of a punched pattern 24. Accordingly, the external shape of the common electrode is not shown in FIG. 2. The common electrode is supplied with a common potential from both right and left sides of the peripheral portion of the liquid crystal cell 4.

Next, the cross-sectional structure of the liquid crystal display device 1 will be described.

In particular, the configuration of the pixel electrode 21 which is a feature of this embodiment will be described referring to FIG. 3, and the configuration of the TFT 15 will be described referring to FIG. 4.

As shown in FIGS. 3 and 4, the liquid crystal display device 1 includes the TFT array substrate 6, the counter substrate 7, and the liquid crystal layer 8 sandwiched between the TFT array substrate 6 and the counter substrate 7. The liquid crystal display device 1 is provided with a seal material (not shown) along the periphery of the opposing surfaces of the TFT array substrate 6 and the counter substrate 7, and the liquid crystal layer 8 is sealed in a space surrounded by the seal material, the TFT array substrate 6, and the counter substrate 7.

The TFT array substrate 6 has a substrate body 35 which is made of, for example, a light transmissive material, such as glass, quartz, or plastic. A base insulating film 36 (base coat) is formed on one surface of the substrate body 35. In the portion of the TFT 15, as shown in FIG. 4, the patterned semiconductor layer 17 is formed on the base insulating film 36. A gate insulating film 37 is formed on the entire surface of the base insulating film 36 so as to cover the semiconductor layer 17. The gate electrode 16 is formed in a portion of the upper surface of the gate insulating film 37. As described above, the gate electrode 16 is constituted by the gate bus line 14. A first interlayer insulating film 38 is formed on the entire surface of the gate insulating film 37 so as to cover the gate electrode 16.

The drain electrode 18 is formed on the upper surface of the first interlayer insulating film 38. The drain electrode 18 is connected to the semiconductor layer 17 through the drain contact hole 20 which passes through the first interlayer insulating film 38 and the gate insulating film 37. An organic insulating film 39 is formed on the entire surface of the first interlayer insulating film 38 so as to cover the drain electrode 18. In the organic insulating film 39, a through hole 23 which passes through the organic insulating film 39 and reaches the drain electrode 18 is formed. The through hole 23 is a portion punched from the organic insulating film 39 so as to form a contact of the pixel electrode 21 and the drain electrode 18.

The common electrode 40 is formed on the upper surface of the organic insulating film 39. A second interlayer insulating film 41 is formed on the organic insulating film 39 so as to cover the common electrode 40. The pixel electrode 21 is formed on the upper surface of the second interlayer insulating film 41. The pixel electrode 21 is connected to the drain electrode 18 through the pixel contact hole 22 which passes through the second interlayer insulating film 41 inside the through hole 23. In this way, of the common electrode 40 and the pixel electrode 21, the pixel electrode 21 positioned on the upper layer side is connected to the drain electrode 18. Accordingly, the common electrode 40 is provided with the punched pattern 24 so as to avoid the contact with the pixel electrode 21. An alignment film 42 is provided so as to cover the pixel electrode 21 on the second interlayer insulating film 41. The alignment film 42 is subjected to alignment treatment so as to regulate the alignment of the liquid crystal molecules constituting the liquid crystal layer 8.

The counter substrate 7 includes a substrate body 11 which is made of, for example, a light transmissive material, such as glass, quartz, or plastic, and a black matrix 44, a color filter 45, and an alignment film 46 which are laminated in order on one surface of the substrate body 11. The black matrix 44 is formed of a material having a high light shielding property including metal, such as chromium, or black resin. The color filter 45 contains color materials of different colors, such as red (R), green (G), and blue (B), corresponding to the pixels 10. The alignment direction of the alignment film 46 is regulated in the same direction as the alignment direction of the alignment film 42.

In FIG. 3, the source bus line 13 is formed on the first interlayer insulating film 38.

The source bus line 13 is the same layer as the drain electrode 18 and is made of the same conductive material as the drain electrode 18. The common electrode 40 is formed on the upper surface of the organic insulating film 39. The pixel electrode 21 is formed above the common electrode 40 through the second interlayer insulating film 41. FIG. 3 is a cross-sectional view taken along a cutting plane line which passes through the second bent portion 31 of the linear electrode 26 and the additional capacitance portion 33. In FIG. 3, the cross-sections of two linear electrodes 26 (second bent portion 31) and the additional capacitance portion 33 on the upper surface of the second interlayer insulating film 41 are shown. In this way, the common electrode 40 and the pixel electrode 21 are opposed to each other through the second interlayer insulating film 41, whereby pixel capacitance C is formed.

The common electrode 40 of this embodiment corresponds to a first electrode described in the appended claims. The pixel electrode 21 of this embodiment corresponds to a second electrode described in the appended claims. The second interlayer insulating film 41 of this embodiment corresponds to an insulating film described in the appended claims.

Figure 5:
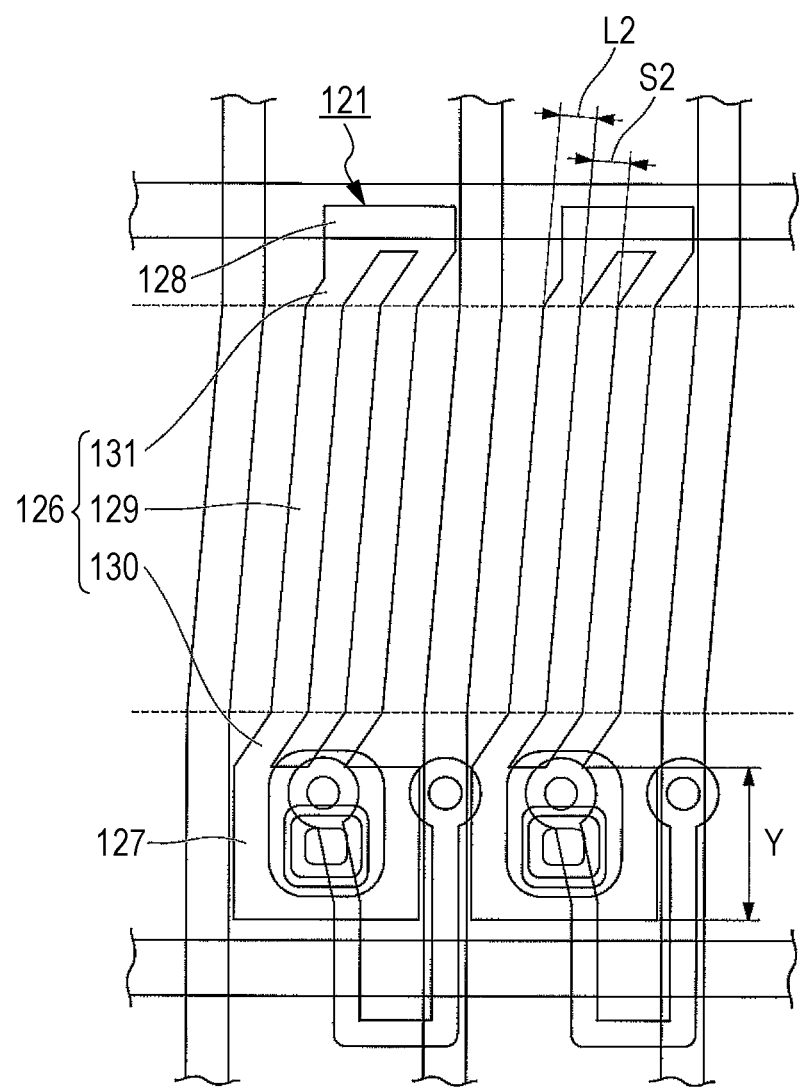
FIG. 5 is a plan view showing two pixels of a liquid crystal display device of a comparative example.

In the related art, when designing this type of pixel electrode, as shown in FIG. 5, it is easily considered that a first connection portion 127 and a second connection portion 128 which are the connection portions of linear electrodes 126 are designed in a simple rectangular shape. A designer performs design for optimizing the conditions for the ratio L2/S2 of the width L2 of a main line portion 129 in the linear electrode 126 having the main line portion 129 and bent portions 130 and 131 and the interval S2 between the main line portions 129 and the like according to various parameters responsible for display characteristics based on the designed shape.

Here, for example, as a countermeasure against a problem, such as flickering, the pixel capacitance may be forced to be increased. As described above, since it is difficult to reduce the thickness of the interlayer insulating film between the pixel electrode and the common electrode, the area of an overlapping portion of a pixel electrode and a common electrode, that is, the area of a pixel electrode 121 is increased. In this case, for example, (1) a method of widening the width L2 of the main line portion 129, (2) a method of increasing the dimension Y of the pixel in the longitudinal direction (the up-down direction of FIG. 5) while keeping the shape of the first connection portion 127 or the second connection portion 128 in a rectangular shape, or the like is considered.

On the other hand, the above two methods have major faults.

In the case of (1), since the ratio L2/S2 of the width L2 of the main line portion 129 and the interval S2 between the main line portions 129 is deviated from an optimum value, the characteristics, such as light transmittance, may be degraded. If the distance between the linear electrodes 126 of adjacent pixels becomes short over an allowable range, color mixing may occur.

In the case of (2), since a portion other than the linear electrode 126 substantially contributing to display is increased, the aperture ratio is degraded and light transmittance is degraded. In the cases of (1) and (2), the optimized design should be significantly reconsidered, and work efficiency of design is bad.

In contrast, in this embodiment, as shown in FIG. 2, the additional capacitance portions 32 and 33 are added so as to extend outward from the first connection portion 27 of the pixel electrode 21 and the second connection portion 28 extended in a direction along the gate bus line 14. With this, as shown in the FIG. 3, pixel capacitance C' for an amount formed by the laminate of the common electrode 40, the second interlayer insulating film 41, and the additional capacitance portion 33 (32) increases compared to a case where the additional capacitance portion is not added. As a result, it is not necessary to change the ratio L/S of the width L of the linear electrode 26 and the interval S between the linear electrodes 26, the dimension of the rectangular portions of the first connection portion 27 and the second connection portion 28, and the like. For this reason, it is possible to avoid the above problems, such as degradation of light transmittance and color mixing.

The triangular additional capacitance portions 32 and 33 are added, whereby the shape and dimension of the interval between the additional capacitance portions 32 and 33 and the linear electrode 26 substantially match the shape and dimension of the interval between two linear electrodes 26. That is, the opposing sides of the additional capacitance portions 32 and 33 and the linear electrode 26 are substantially in parallel to each other, and the interval S' between the additional capacitance portions 32 and 33 and the linear electrode 26 is substantially equal to the interval S between two adjacent linear electrodes 26. With this, when the pressing force is applied to the liquid crystal display device 1 from the outside, an effect that display unevenness is not easily visually recognized by the user is obtained. Furthermore, since the additional capacitance portions 32 and 33 are disposed in the light-shielding region G, display unevenness is not more easily visually recognized.

The inventors have measured samples with the pattern (FIG. 2) of the pixel electrode 21 of this embodiment and the pattern (FIG. 5) of the pixel electrode 121 of a comparative example and have compared various characteristics. The result is shown in [Table 1].

TABLE 1

| | Pixel Electrode | |
|---|---|---|
| | Example (With Additional Pattern) | Comparative Example (No Additional Pattern) |
| Pixel Capacitance (Pixel Electrode-Counter Electrode Overlapping Portion Area) | A | — |
| Flicker Rate | A | B |
| Unevenness | A | A |
| Color Mixing | B | A |
| Transmittance | A | A |

In [Table 1], "A" and "B" represent a relative comparison result of the example and the comparative example.

As shown in [Table 1], in this embodiment, the area of the overlapping portion of the pixel electrode 21 and the common electrode 40 was increased, and the pixel capacitance was increased relative to the comparative example. Accordingly, the flicker rate was decreased relative to the comparative example. The inventors have set specific conditions for the dimension of each portion, the film thickness, and the like and have confirmed through measurement that the pixel capacitance is increased by about 10 to 15% and the flicker rate relatively decreases by 10%.

The flicker rate is an index representing the degree of flickering.

In this embodiment, display unevenness which will occur when the pressing force is applied to the liquid crystal display device 1 was not substantially generated, and the same excellent result as in the comparative example was obtained. The additional capacitance portions 32 and 33 are added, whereby the distance between some pixel electrodes of adjacent pixels 10 becomes short according to the occurrence situation of color mixing. As a result, strictly, display unevenness is slightly deteriorated relative to the comparative example. However, the deterioration is in a level which does not cause a problem for use. Light transmittance was the same as in the comparative example, and sufficiently bright display was obtained.

[First Modification Example of Pixel Electrode]

In the foregoing embodiment, although the triangular additional capacitance portions 32 and 33 are provided, the shape of the additional capacitance portion may not be necessarily a triangular shape.

Figure 6:
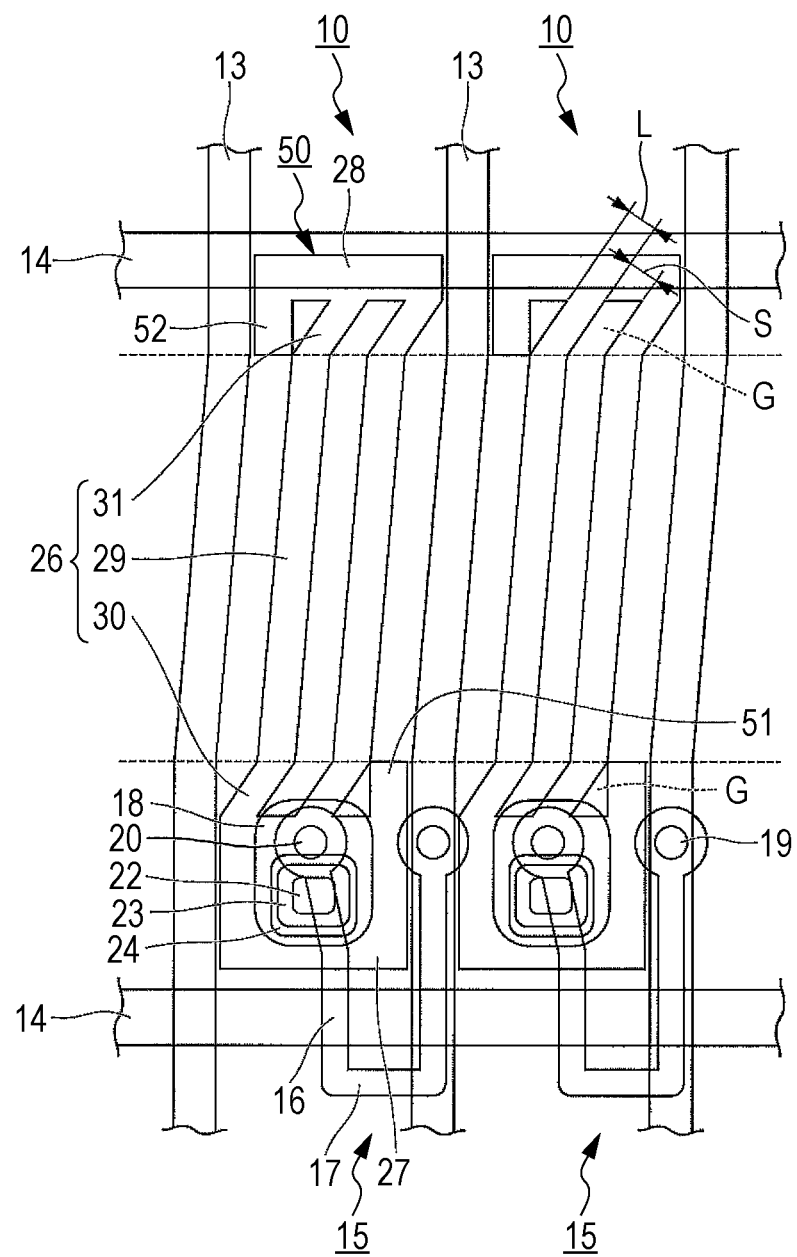
FIG. 6 is a plan view showing two pixels of a liquid crystal display device of a first modification example.

FIG. 6 is a plan view showing two adjacent pixels of a liquid crystal display device of a first modification example.

In FIG. 6, the constituents common to FIG. 2 are represented by the same reference numerals, and description thereof will not be repeated.

In a pixel electrode 50 of this modification example, a rectangular additional capacitance portion 51 is provided in a region along the arrangement direction of a plurality of first bent portions 30. Similarly, a rectangular additional capacitance portion 52 is provided in a region along the arrangement direction of a plurality of second bent portions 31. The additional capacitance portions 51 and 52 are disposed in the light-shielding region G together with the first bent portion 30 and the second bent portion 31.

In the electrode shape of this modification example, unlike the electrode shape of the foregoing embodiment, the shape and dimension of the interval between the additional capacitance portions 51 and 52 and the adjacent linear electrode 26 do not match the shape and dimension of the interval between two adjacent linear electrodes 26. With this, slight alignment disorder of liquid crystal may occur near the additional capacitance portions 51 and 52. However, since the additional capacitance portions 51 and 52 are disposed in the light-shielding region G, even if slight alignment disorder of liquid crystal occurs, display quality is not significantly damaged.

[Second Modification Example of Pixel Electrode]

In the foregoing embodiment, although the entire additional capacitance portions 32 and 33 are disposed in the light-shielding region G, the entire additional capacitance portion may not be necessarily disposed in the light-shielding region.

Figure 7:
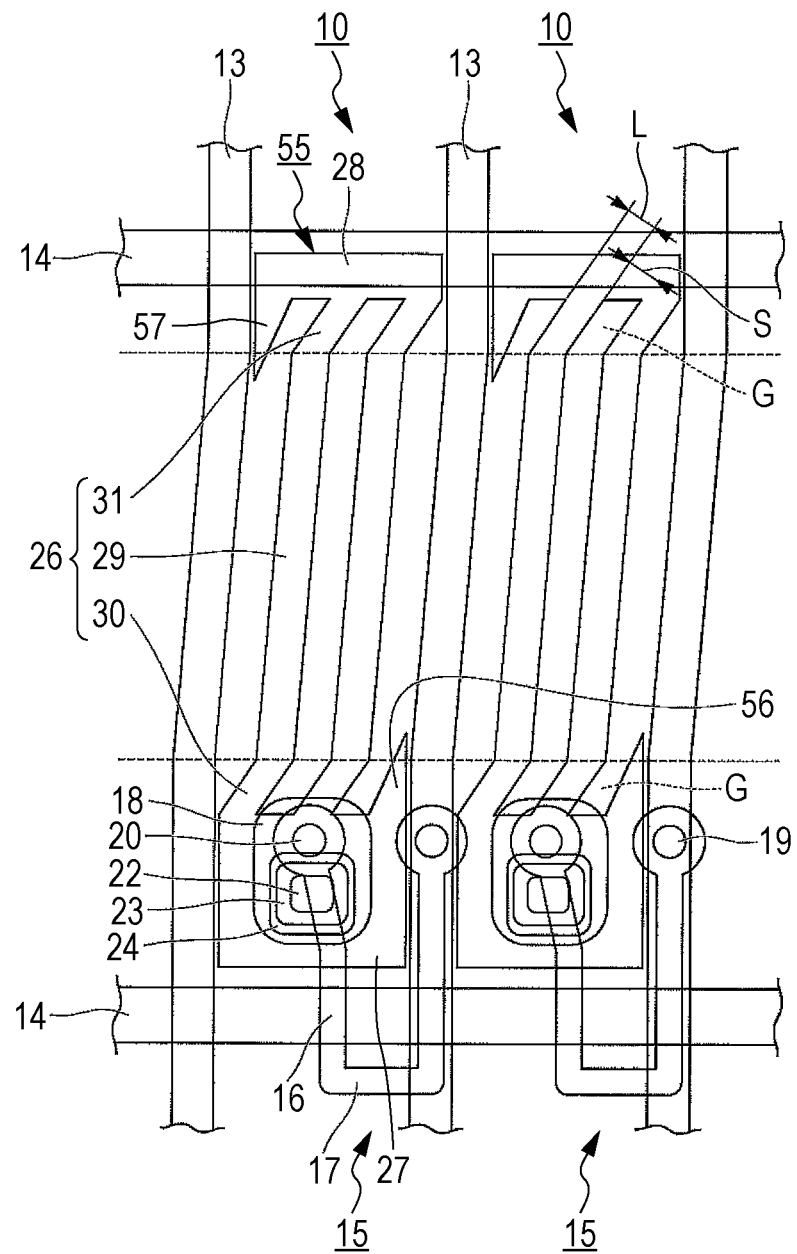
FIG. 7 is a plan view showing two pixels of a liquid crystal display device of a second modification example.

FIG. 7 is a plan view showing two adjacent pixels of a liquid crystal display device of a second modification example.

In FIG. 7, the constituents common to FIG. 2 are represented by the same reference numerals, and description thereof will not be repeated.

In a pixel electrode 55 of this modification example, a substantially triangular additional capacitance portion 56 is provided in a region along the arrangement direction of a plurality of first bent portions 30. In the additional capacitance portion 56, the side close to the first connection portion 27 is disposed in the light-shielding region G, and the side (the leading end side of the triangle) distant from the first connection portion 27 protrudes outside the light-shielding region G. Similarly, a substantially triangular additional capacitance portion 57 is provided in a region along the arrangement direction of a plurality of second bent portions 31. In the additional capacitance portion 57, the side close to the second connection portion 28 is disposed in the light-shielding region G, and the side (the leading end side of the triangle) distant from the second connection portion 28 protrudes outside the light-shielding region G.

In this modification example, since part of the additional capacitance portions 56 and 57 protrudes from the light-shielding region G, alignment disorder of liquid crystal or color mixing with the addition of the additional capacitance portions 56 and 57 may slightly affect display. On the other hand, since the area of the additional capacitance portions 56 and 57 is not limited to the light-shielding region G and is made large, it is suitable for significantly increasing pixel capacitance.

In this way, the effect to increase the pixel capacitance and the problems, such as degradation of light transmittance and color mixing, with the addition of the additional capacitance portion are in the relationship of trade-off. Accordingly, the designer may optimize the shape, dimension, and the like of the additional capacitance portion while considering the balance of the effect to increase the pixel capacitance and the problems, such as degradation of light transmittance and color mixing. The apex of the triangle which is the external shape of the additional capacitance portion may not be necessarily sharpened, and may be chamfered or rounded.

[Second Embodiment]

Hereinafter, a second embodiment of the invention will be described referring to FIG. 8.

Figure 8:
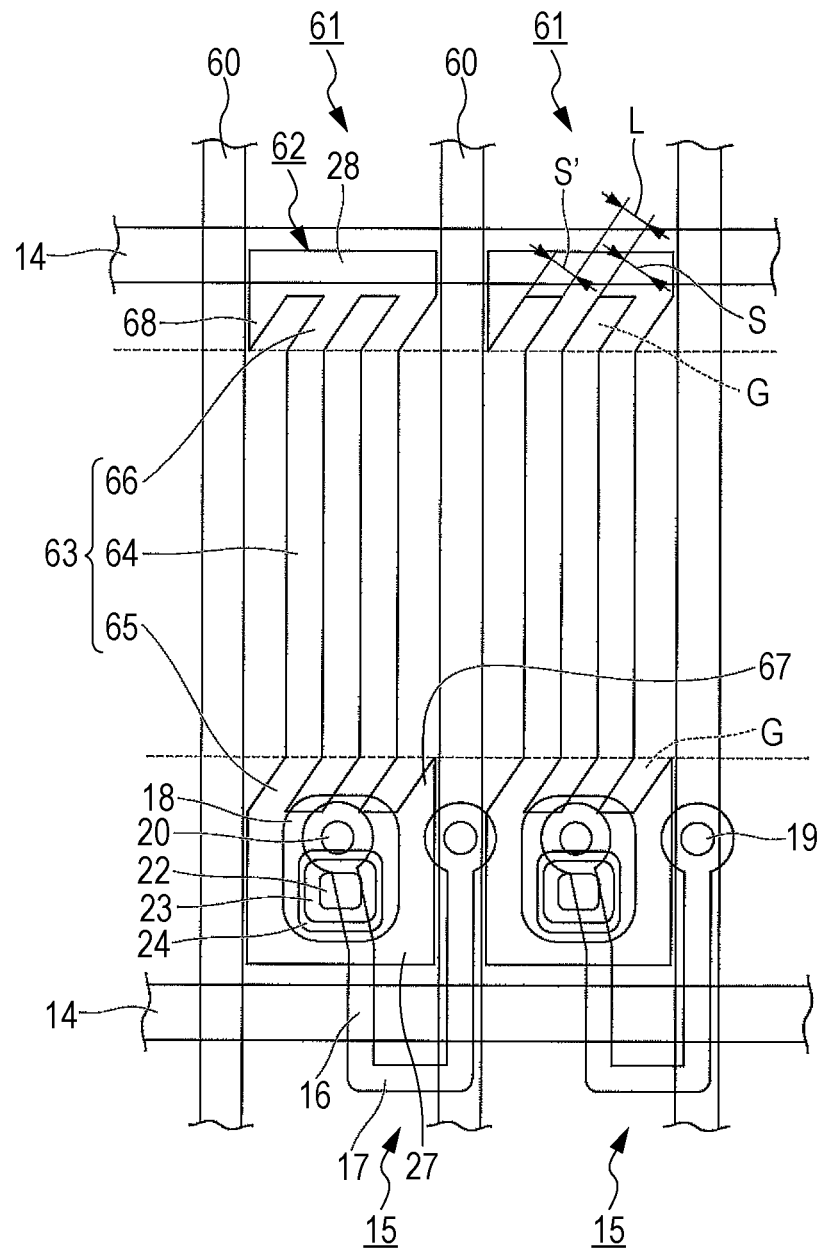
FIG. 8 is a plan view showing two pixels of a liquid crystal display device of a second embodiment.

FIG. 8 is a plan view showing two adjacent pixels of a liquid crystal display device of this embodiment.

In FIG. 8, the constituents common to FIG. 2 are represented by the same reference numerals, and description thereof will not be repeated.

In the first embodiment, an example where the invention is applied to a liquid crystal display device having a dual domain structure with two adjacent pixels as a single unit has been described. In this embodiment, an example where the invention is applied to a liquid crystal display device having no dual domain structure will be described.

In this embodiment, as shown in FIG. 8, a source bus line 60 extends linearly, and the shape of a pixel 61 surrounded by the source bus line 60 and the gate bus line 14 is a rectangular shape. A main line portion 64 of a linear electrode 63 constituting a part of a pixel electrode 62 is disposed in parallel to the source bus line 60. Accordingly, in this embodiment, in all pixels 61, the main line portion 64 of the linear electrode 63 is along the longitudinal direction of the pixels 61, and an alignment division structure is not used.

A substantially triangular additional capacitance portion 67 is provided in a region along the arrangement direction of a plurality of first bent portions 65. The additional capacitance portion 67 is disposed in the light-shielding region G. The opposing sides of the additional capacitance portion 67 and the linear electrode 63 are substantially in parallel to each other, and the interval S' between the additional capacitance portion 67 and the linear electrode 63 is substantially equal to the interval S between two adjacent linear electrodes 63. Similarly, a substantially triangular additional capacitance portion 68 is provided in a region along the arrangement direction of a plurality of second bent portions 66. The additional capacitance portion 68 is disposed in the light-shielding region G. The opposing sides of the additional capacitance portion 68 and the linear electrode 63 are substantially in parallel to each other, and the interval S' between the additional capacitance portion 68 and the linear electrode 63 is substantially equal to the interval S between two adjacent linear electrodes 63.

In this embodiment, the same effect as in the first embodiment that it is possible to realize a liquid crystal display device which increases pixel capacitance to suppress flickering or the like while suppressing the occurrence of problems of degradation of light transmittance, color mixing, and the like, and achieves high display quality is obtained.

The technical scope of the invention is not limited to the foregoing embodiments, and various changes may be made without departing from the spirit and scope of the invention.

For example, in the foregoing embodiments, although an example where the additional capacitance portions are added on both the first connection portion side and the second connection portion side, when the increase in the pixel capacitance can be secured only by one additional capacitance portion, an additional capacitance portion may be added on either the first connection portion side or the second connection portion side.

In addition, specific features of various wirings including source bus lines and gate bus lines, TFTs, and the like are not limited to the foregoing embodiments and can be appropriately changed.

INDUSTRIAL APPLICABILITY

The invention can be used for an FFS liquid crystal display device.

REFERENCE SIGNS LIST

1 LIQUID CRYSTAL DISPLAY DEVICE
6 TFT ARRAY SUBSTRATE (FIRST SUBSTRATE)

7 COUNTER SUBSTRATE (SECOND SUBSTRATE)
10, 61 PIXEL
21, 50, 55, 62 PIXEL ELECTRODE (SECOND ELECTRODE)
26, 63 LINEAR ELECTRODE
27 FIRST CONNECTION PORTION
28 SECOND CONNECTION PORTION
29, 64 MAIN LINE PORTION
30, 65 FIRST BENT PORTION
31, 66 SECOND BENT PORTION
32, 33, 51, 52, 56, 57, 67, 68 ADDITIONAL CAPACITANCE PORTION
40 COMMON ELECTRODE (FIRST ELECTRODE)
41 SECOND INTERLAYER INSULATING FILM (INSULATING FILM)

The invention claimed is:

1. A liquid crystal display device comprising:
a first substrate;
a second substrate;
a liquid crystal layer between the first substrate and the second substrate;
a first electrode on a liquid crystal layer side of the first substrate;
an insulating film that covers the first electrode; and
a second electrode on the insulating film, wherein
the second electrode includes a plurality of linear electrodes and a first connection portion, the plurality of linear electrodes are at predetermined intervals and the first connection portion connects first end portions of the plurality of linear electrodes,
each of the plurality of linear electrodes includes a main line portion and a first bent portion between the main line portion and the first connection portion that is angled in a direction different from an extension direction of the main line portion,
the second electrode further includes a first additional capacitance portion that is integral with the first connection portion in a region along an arrangement direction of the plurality of first bent portions and extends parallel to the first bent portions from an outermost edge of the first connection portion, and
a length of the first additional capacitance portion is substantially equal to a length of the first bent portion.

2. The liquid crystal display device according to claim 1, wherein
the second electrode further includes a second connection portion that connects second end portions opposite to the first end portions of the plurality of linear electrodes,
each of the plurality of linear electrodes further includes a second bent portion between the main line portion and the second connection portion and is angled in a direction different from the extension direction of the main line portion, and
the second electrode further includes a second additional capacitance portion that is integral with the second connection portion in a region along an arrangement direction of a plurality of second bent portions.

3. The liquid crystal display device according to claim 2, wherein a length of the second additional capacitance portion is substantially equal to a length of the second bent portion.

4. The liquid crystal display device according to claim 2, further comprising:
a gate bus line extending in a first direction;
a source bus line extending in a second direction and crossing the gate bus line, and
a switching element adjacent to the crossing of the gate bus line and the source bus line, wherein
a distance between the switching element and the first connection portion is shorter than a distance between the switching element and the second connection portion.

5. The liquid crystal display device according to claim 1, wherein
opposing sides of the first additional capacitance portion and the linear electrode adjacent to the first additional capacitance portion are substantially parallel to each other, and
a first interval between the first additional capacitance portion and the linear electrode is substantially equal to an interval between two adjacent linear electrodes.

6. The liquid crystal display device according to claim 1, wherein the first additional capacitance portion is in a light-shielding region.

7. The liquid crystal display device according to claim 1, wherein in a first pixel and a second pixel adjacent to each other, an extension direction of the linear electrode of the first pixel and an extension direction of the linear electrode of the second pixel are inclined in opposite directions relative to a longitudinal direction of the first pixel and the second pixel.

8. The liquid crystal display device according to claim 1, wherein the first additional capacitance portion has a triangular shape.

9. The liquid crystal display device according to claim 1, wherein
rows of pixels are provided in the liquid crystal display device; and
the linear electrodes provided in directly adjacent ones of the rows of pixels extend in opposite directions.

10. A liquid crystal display device comprising:
a first substrate;
a second substrate;
a liquid crystal layer between the first substrate and the second substrate;
a first electrode on a liquid crystal layer side of the first substrate;
an insulating film that covers the first electrode; and
a second electrode on the insulating film,
a gate bus line extending in a first direction,
a source bus line extending in a second direction and crossing the gate bus line, and
a switching transistor arranged near the crossing of the gate bus line and the source bus line, wherein
the second electrode includes a plurality of linear electrodes and a first connection portion, the plurality of linear electrodes are at predetermined intervals and the first connection portion connects first end portions of the plurality of linear electrodes,
each of the plurality of linear electrodes includes a main line portion, and a first bent portion between the main line portion and the first connection portion and is angled in a direction different from an extension direction of the main line portion,
the second electrode further includes a first additional capacitance portion that is integral with the first connection portion in a region along an arrangement direction of a plurality of first bent portions and extends perpendicular to the first direction,
at least a portion of the source bus line extends in parallel with the main line portion of the linear electrode, and
the first additional capacitance portion is in a light-shielding region.

11. The liquid crystal display device according to claim 10, wherein an extending direction of the main line portion is inclined from the first direction.

12. The liquid crystal display device according to claim 10, wherein the source bus line crosses perpendicularly with the gate bus line.

13. The liquid crystal display device according to claim 10, wherein a length of the first additional capacitance portion is substantially equal to a length of the first bent portion.

14. The liquid crystal display device according to claim 10, wherein
the second electrode further includes a second connection portion which connects second end portions opposite to the first end portions of the plurality of linear electrodes,
each of the plurality of linear electrodes further includes a second bent portion between the main line portion and the second connection portion and is angled in a direction different from the extension direction of the main line portion, and
the second electrode further includes a second additional capacitance portion that is integral with the second connection portion in a region along an arrangement direction of a plurality of second bent portions.

15. The liquid crystal display device according to claim 14, wherein a length of the second additional capacitance portion is substantially equal to a length of the second bent portion.

16. The liquid crystal display device according to claim 14, further comprising:
a gate bus line extending in a first direction,
a source bus line extending in a second direction and crossing the gate bus line, and
a switching element adjacent to the crossing of the gate bus line and the source bus line, wherein
a distance between the switching element and the first connection portion is shorter than a distance between the switching element and the second connection portion.

17. The liquid crystal display device according to claim 10, wherein
opposing sides of the first additional capacitance portion and the linear electrode adjacent to the first additional capacitance portion are substantially parallel to each other, and
a first interval between the first additional capacitance portion and the linear electrode is substantially equal to an interval between two adjacent linear electrodes.

18. The liquid crystal display device according to claim 10, wherein in a first pixel and a second pixel adjacent to each other, an extension direction of the linear electrode of the first pixel and an extension direction of the linear electrode of the second pixel are angled in opposite directions relative to a longitudinal direction of the first pixel and the second pixel.

19. The liquid crystal display device according to claim 10, wherein the first additional capacitance portion has a triangular shape.

20. A liquid crystal display device comprising:
a first substrate;
a second substrate;
a liquid crystal layer between the first substrate and the second substrate;
a first electrode on a liquid crystal layer side of the first substrate;
an insulating film that covers the first electrode;
a second electrode on the insulating film;
a gate bus line extending in a first direction;
a source bus line extending in a second direction and crossing the gate bus line; and
a switching transistor arranged near the crossing of the gate bus line and the source bus line; wherein
the second electrode includes a plurality of linear electrodes and a first connection portion, the plurality of linear electrodes are at predetermined intervals and the first connection portion connects first end portions of the plurality of linear electrodes,
each of the plurality of linear electrodes includes a main line portion, and a first bent portion between the main line portion and the first connection portion and is angled in a direction different from an extension direction of the main line portion,
the second electrode further includes a first additional capacitance portion that is integral with the first connection portion in a region along an arrangement direction of a plurality of first bent portions and extends perpendicular to the first direction,
at least a portion of the source bus line extends in parallel with the main line portion of the linear electrode,
rows of pixels are in the liquid crystal display device, and
the linear electrodes in directly adjacent ones of the rows of pixels extend in opposite directions.

* * * * *